(12) United States Patent
Ito (10) Patent No.: US 7,071,951 B2
(45) Date of Patent: Jul. 4, 2006

(54) IMAGE PROCESSOR

(75) Inventor: Taro Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 153 days.

(21) Appl. No.: 09/887,168

(22) Filed: Jun. 25, 2001

(65) Prior Publication Data

US 2002/0060693 A1 May 23, 2002

Related U.S. Application Data

(62) Division of application No. 09/257,953, filed on Feb. 26, 1999, now Pat. No. 6,304,269.

(30) Foreign Application Priority Data

Feb. 27, 1998 (JP) ............................... 1998-64683

(51) Int. Cl.
*G09G 5/02* (2006.01)
*G09G 5/00* (2006.01)

(52) U.S. Cl. ...................... 345/597; 345/589; 345/606; 345/604; 345/611

(58) Field of Classification Search ................ 345/426, 345/589, 591, 611, 501, 443, 606, 597, 604; 382/254, 269; 358/1.9
See application file for complete search history.

(56) References Cited

U.S. PATENT DOCUMENTS

| | | | |
|---|---|---|---|
| 4,720,705 A | 1/1988 | Gupta et al. .................. 345/20 |
| 4,796,020 A * | 1/1989 | Budrikis et al. ............. 345/418 |
| 5,051,928 A | 9/1991 | Gruters ....................... 345/431 |
| 5,299,308 A * | 3/1994 | Suzuki et al. ............... 345/501 |
| 5,325,474 A | 6/1994 | Kumazaki et al. ........... 345/433 |
| 5,371,515 A * | 12/1994 | Wells et al. ................. 345/596 |
| 5,422,991 A * | 6/1995 | Fowler ......................... 345/443 |
| 5,502,795 A | 3/1996 | Shirouzu ..................... 382/269 |
| 5,886,701 A | 3/1999 | Chauvin et al. ............. 345/418 |
| 5,898,440 A * | 4/1999 | Tachibana ................... 345/443 |

FOREIGN PATENT DOCUMENTS

JP 7-234948 9/1995

OTHER PUBLICATIONS

Foley, J. "Computer Graphics: Principles and Practice Second Edition in C", 1996, pp. 580-581, 584-585.*
Fujio Yamaguchi et al., "Practical Computer Graphics", Nikkankogyo Shinbun Co., Feb. 28, 1987, pp. 118-125.

* cited by examiner

*Primary Examiner*—Richard Hjerpe
*Assistant Examiner*—Chante Harrison
(74) *Attorney, Agent, or Firm*—Sughrue Mion, PLLC (57) ABSTRACT

An image processing device of the present invention has a first element which produces partial straight lines from a straight line. One of the vertical or horizontal coordinate values of each of the partial straight lines has the same value. The image processing device has a second element which produces, based on the partial line produced by the first element, a shading range having a first and second end, wherein the first end has first color and the second end has second color, and a third element which converts the first and second colors of the shading range to third and fourth colors, which express brightness as an independent parameter. The image processing device also includes a fourth element which produces, by using the third and fourth colors converted by the third element, colors of respective pixels existing between the first end and the second end of the shading range produced by the second element, wherein the color changes smoothly from the first end to the second end.

4 Claims, 6 Drawing Sheets

IMAGE PROCESSOR

This is a divisional of Application No. 09/257,953 filed Feb. 26, 1999, now U.S. Pat. No. 6,304,269 the disclosure of which is incorporated herein by reference.

BACKGROUND OF THE INVENTION

The present invention relates to an image processor, and more particularly, to an image processor which draws a high quality oblique line.

Generally, a conventional image processor has difficulty displaying an oblique straight line. The line is typically displayed in a step-like shape. This is called aliasing. To smoothly display the oblique straight line, a conventional image processor performs an anti-alias program. The conventional image processor processes image data ace outside a frame buffer based on the anti-alias program, and then the image processor stores the image data in the frame buffer. Such a conventional image processor is disclosed in, for example, Fujio Yamaguchi et al. "Practical computer graphics", Nikkankogyo Shinbun Co., Feb. 28, 1987, the first impression of the first edition, pp. 118–125.

The conventional image processor, however, has a problem because the anti-alias process is performed by software. Therefore, it is difficult to accelerate the anti-alias process.

In addition, the conventional image processor has another problem because the anti-alias process uses color data expressed in an RGB color space. Human visual characteristics are sensitive to a change of brightness rather than a change of chromaticity. Therefore, if a change of color brightness is sharp, even if color density or hue do not change, the change stands out and is sensed. In this circumstance, while it is preferable to continuously change the brightness for performing high quality anti-alias processing, the color data expressed in the RGB color space cannot make continuous changes of the brightness. This is because it is impossible, in the RGB color space, to dissolve the color data to brightness and chromaticity. This is the reason why sufficient quality cannot be obtained if the color data is used while being expressed in the RGB color space.

SUMMARY OF THE INVENTION

An object of the present invention is to provide an image processor which performs high quality anti-alias processing at high speed.

Another object of the present invention is to provide an image processor which draws an oblique line in a color which is specified in an RGB color space.

According to one aspect of the present invention, an image processing device is provided which comprises: a first element which produces partial straight lines from a straight line, wherein one of vertical or horizontal coordinate values of each of the partial straight lines has the same value; a second element which produces, based on the partial line produced by the first element, a shading range having a first and second end, wherein the first end has a first color and the second end has a second color; a third element which converts the first and second colors of the shading range to third and fourth colors, which express brightness as an independent parameter; and a fourth element which produces, by using the third and fourth colors converted by the third element, color of respective pixels between the first end and the second end of the shading range produced by the second element, wherein the color changes smoothly from the first end to the second end.

According to another aspect of the present invention, an image processing device is provided which comprises: a first element which produces partial straight lines, each of which is parallel to one of a vertical or a horizontal line, from a line; a second element which separates a color brightness parameter of each of the partial straight lines; and a third element which produces ranges locating adjacent to the partial straight lines, respectively, and makes the color of each of the ranges change smoothly from the starting point to the ending point by using the brightness parameter.

According to another aspect of the present invention, an image processing method is provided which comprises: producing partial straight lines from a straight line, wherein one of vertical or horizontal coordinate values of each of the partial straight lines has the same value; producing, based on the partial line produced during the producing step, a shading range having a first and second end, wherein the first end has first color and the second end has second color; converting the first and second color of the shading range to third and fourth colors, which express brightness as an independent parameter; and producing, by using the third and fourth colors converted during the converting step, color of respective pixels between the first end and the second end of the shading range, wherein the color changes smoothly from the first end to the second end.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

A first embodiment of the present invention will be described in detail below.

Figure 1:
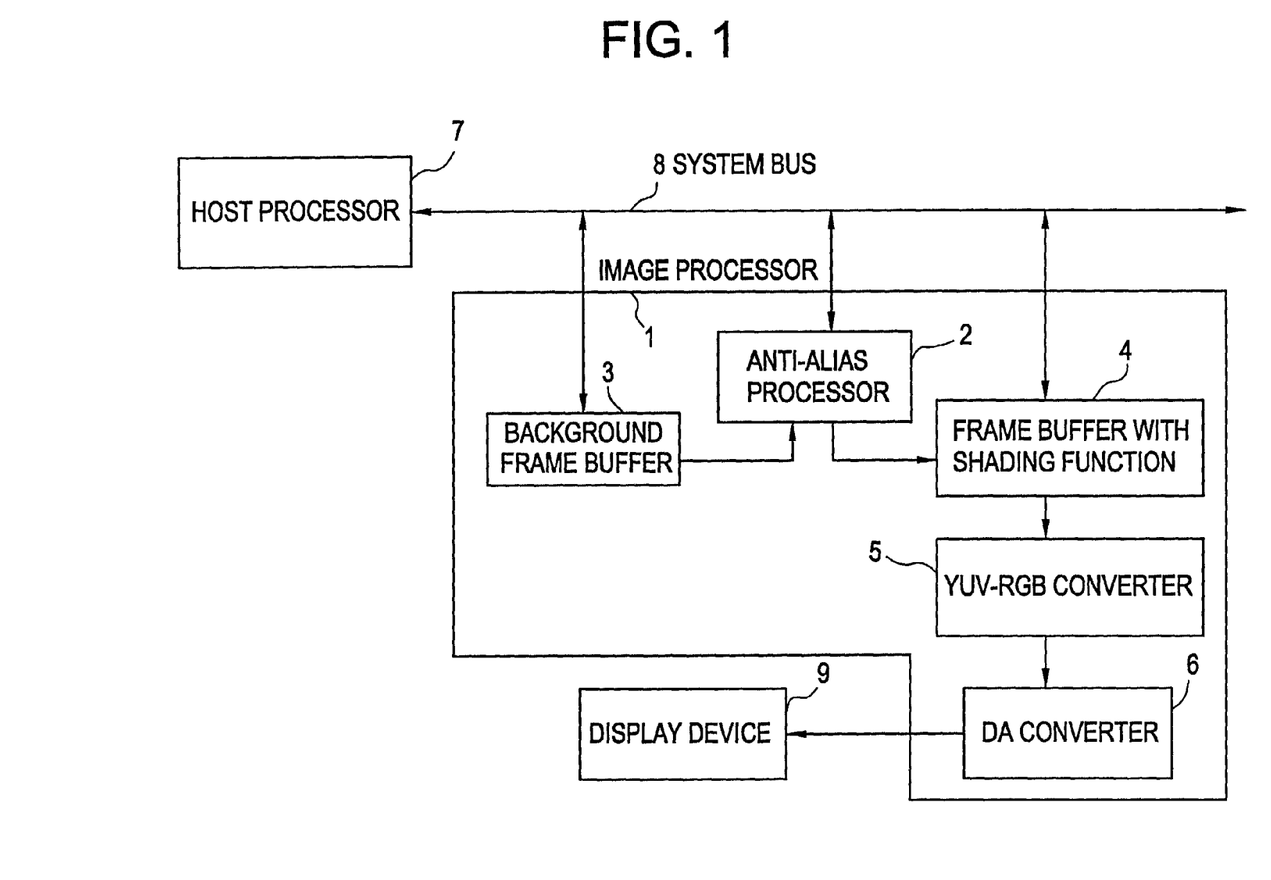
FIG. 1 is a block diagram of the present invention.

Referring to FIG. 1, an image processor 1 is connected to a host processor 7 via a system bus 8. A display device 9, such as a CRT, is connected to image processor Image processor 1 includes an anti-alias processor 2, a background frame buffer 3, a frame buffer 4 with a shading function, a YUV-RGB converter 5, and a digital to analog (DA) converter 6.

Figure 2:
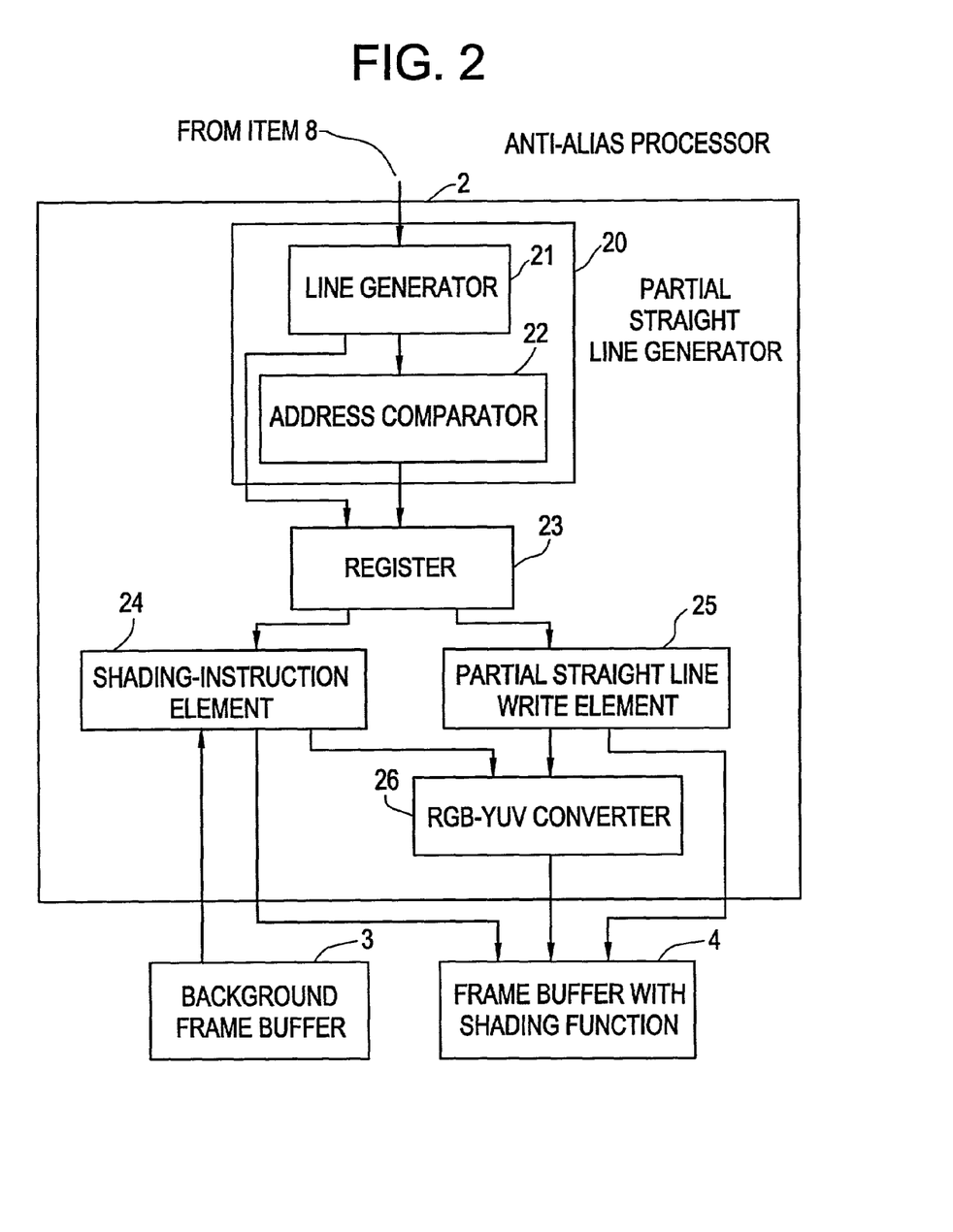
FIG. 2 is a block diagram of an anti-alias processor 2.

In FIG. 2, anti-alias processor 2 includes a partial straight line generator 20, a register 23, a shading-instruction element 24, a partial straight line write element 25, and an RGB-YUV converter 26.

Partial straight line generator 20 produces partial straight lines from a line which host processor 7 designates to be drawn. One of the vertical or horizontal coordinate values of the partial straight line has the same value. More specifically, partial straight line generator 20 obtains coordinate values of the starting point and the ending point of each partial straight line from a set of a plurality of partial straight lines that are parallel to the X axis or Y axis. Partial straight line generator 20 has a line generator 21 and an address comparator 22.

Line generator 21 performs linear interpolation based on the coordinate values of the starting point and the ending point of the line designated by host processor 7, and sequentially outputs coordinate values of the starting point and ending point and the coordinate values of pixels between the starting point and ending point, starting from the pixel nearest to the starting point.

Address comparator 22 obtains coordinate values of the starting point and ending point of the partial straight line based on the coordinate values output from line generator 21. More specifically, whenever address comparator 22 detects that the X and Y coordinate values, which are output from line generator 21, change simultaneously, address comparator 22 writes the coordinate values of the starting point and ending point of each partial straight line in the register 23.

Register 23 stores the coordinate values of the starting point and ending point of each partial straight line that are obtained by partial straight line generator 20, and color data of a straight line expressed in the RGB color space.

Partial straight line write element 25 outputs coordinate values of the starting point and ending point of a predetermined partial straight line or lines, and color data (Ra, Ga, Ba) of the straight line, which is designated by host processor 7, as color data of the starting point and ending point, and is expressed in the RGB color space, to frame buffer 4. In this embodiment, the predetermined partial straight line is the partial straight line or lines, except the partial straight line nearest to the starting point of the straight line designated by host processor 7, among all partial straight lines whose coordinate values of the starting points and ending points are stored in register 23.

Shading-instruction element 24 produces a shading range based on the coordinate values of the starting point and ending point of partial straight lines stored in register 23. Shading-instruction element 24 outputs the coordinate values of the starting point and ending point of the shading range to frame buffer 4. Also, shading-instruction element 24 outputs background color data (Rh, Gh, Bh) expressed in the RGB color space as color data of the starting point of the shading range, and outputs color data (Ra, Ga, Ba) of the straight line, which is designated by host processor 7, as color data of the ending point. In addition, the background color data (Rh, Gh, Bh) is obtained from the address of background frame buffer 3 that corresponds to the starting point of the shading range.

RGB-YUV converter 26 converts the color data, which is outputted from shading-instruction element 24 and partial straight line write element 25 and which is expressed in the RGB color space, into color data, which is expressed in the YUV color space, by performing the operation shown in Equation (1) below:

$$\begin{bmatrix} Y \\ U \\ V \end{bmatrix} = \begin{bmatrix} 0.299 & 0.587 & 0.114 \\ -0.1684 & -0.332 & 0.500 \\ 0.500 & -0.419 & -0.081 \end{bmatrix} \begin{bmatrix} R \\ G \\ B \end{bmatrix} \quad (1)$$

Background frame buffer 3 stores a frame of color data (Rh, Gh, Bh), which is expressed in the RGB color space.

Figure 3:
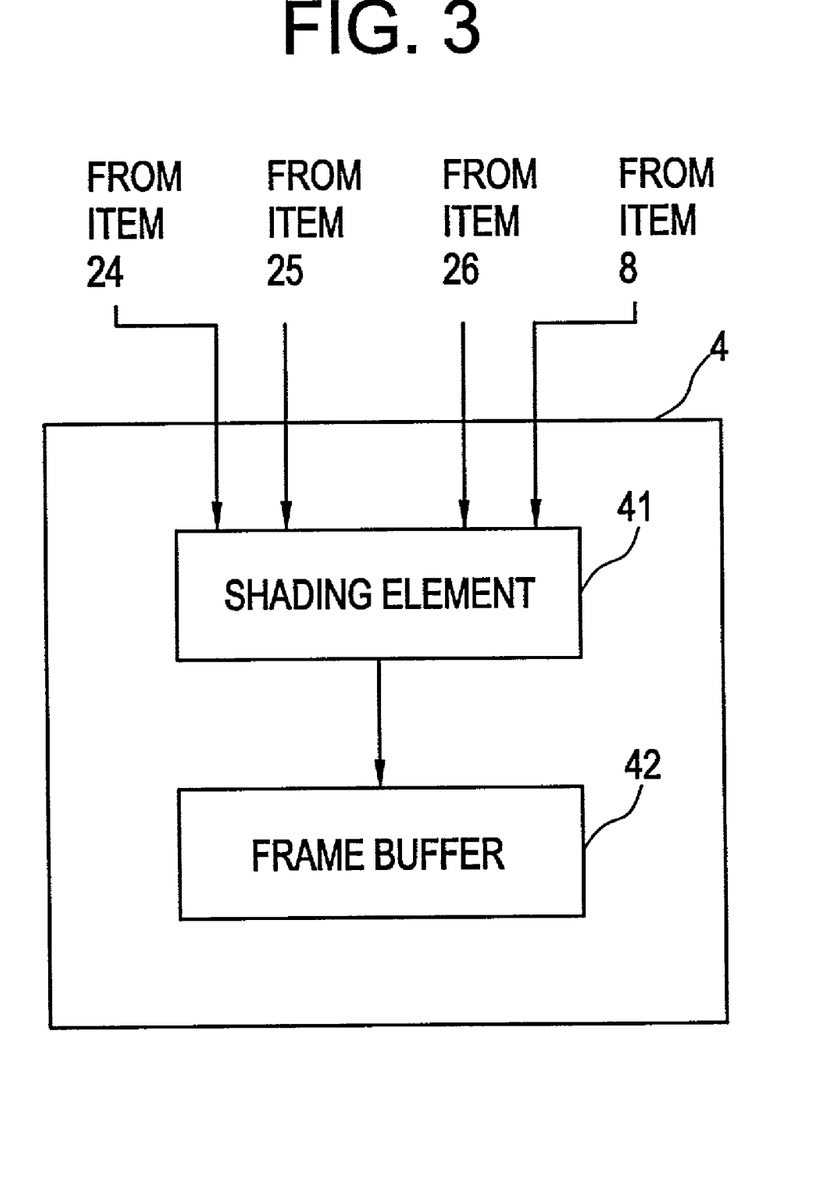
FIG. 3 is a block diagram of a frame buffer 4 with a shading function.

Referring to FIG. 3, frame buffer 4, which has a shading function, comprises a shading element 41 and a frame buffer 42. Frame buffer 42 stores color data, which is expressed in the YUV color space, of each pixel on a screen of a display device 9.

Shading element 41 produces color of respective pixels between the starting point and the ending point of the partial straight line or the shading range, when coordinate values of the starting point and ending point and color data, which is expressed in the YUV color space, of the starting point and ending point are given. More specifically, shading element 41 computes color data for each pixel between the starting point and ending point by performing linear interpolation for every Y, U, or V component. Shading element 41 writes the color data obtained for each pixel and the color data of the starting point and ending point in frame buffer 42. An example of the composition of shading element 41 is disclosed in Japanese Patent Application Laid-Open No. 7-234948.

YUV-RGB converter 5 converts color data, which is expressed in the YUV color space and is stored in frame buffer 42 of frame buffer 4, into color data, which is expressed in the RGB color space, and outputs the converted color data. This conversion is performed with calculation shown in Equation (2) below:

$$\begin{bmatrix} R \\ G \\ B \end{bmatrix} = \begin{bmatrix} 1.000 & 0 & 1.402 \\ 1.000 & -0.344 & -0.714 \\ 1.000 & 1.771 & -0.001 \end{bmatrix} \begin{bmatrix} Y \\ U \\ V \end{bmatrix} \quad (2)$$

DA converter 6 converts digital color data, which is output from the YUV-RGB converter 5, into an analog signal and outputs the signal to display device 9.

Next, the operation of this embodiment will be described.

Figure 4:
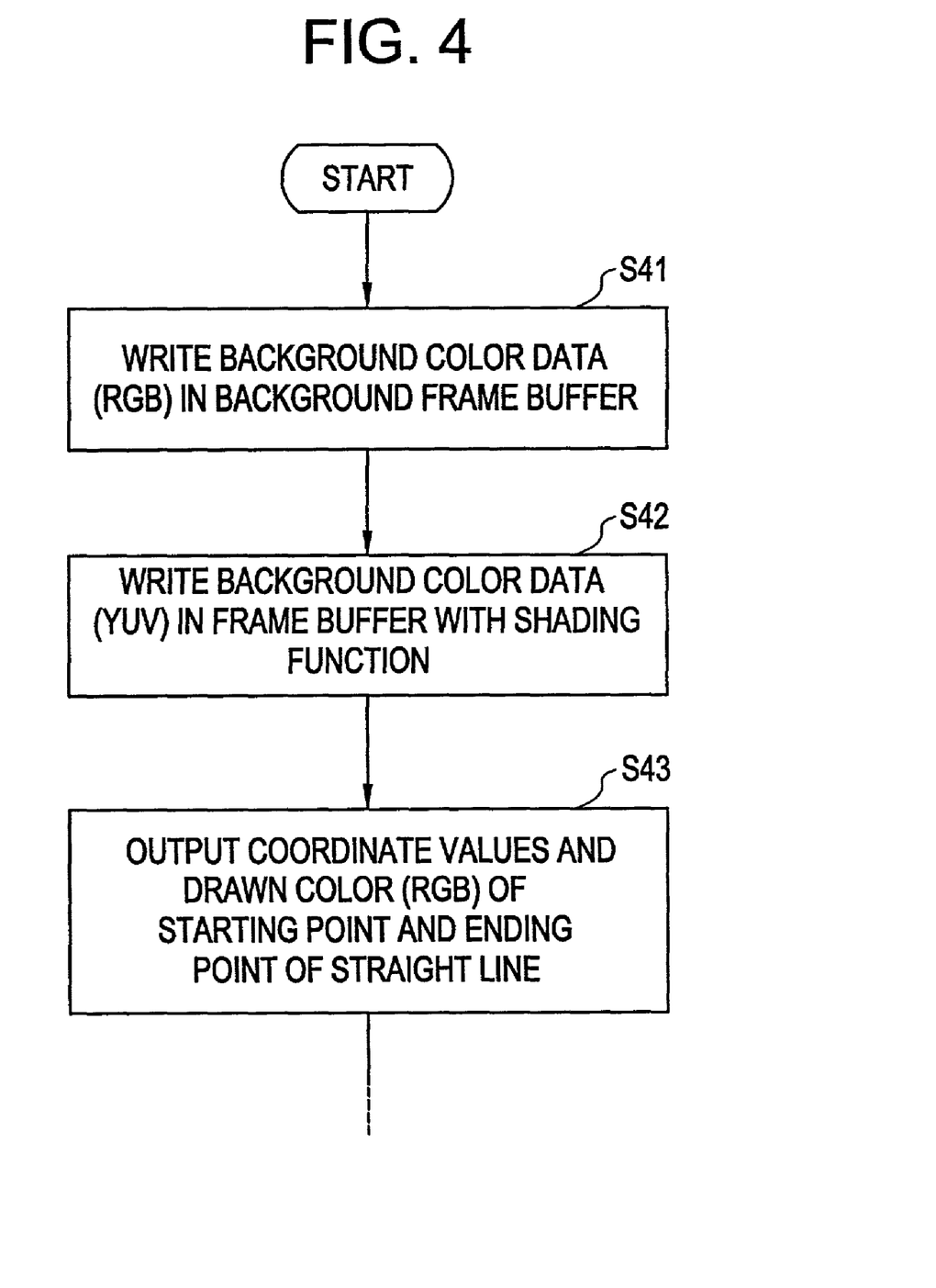
FIG. 4 is a flow chart showing the operation of a host processor 7.

Referring to FIGS. 1 and 4, when a straight line is drawn on the screen of display device 9, host processor 7 first writes background color data (Rh, Gh, Bh), which is expressed in the RGB color space, to background frame buffer 3 (step S41).

In step S42, host processor 7 writes the background color data (Yh, Uh, Vh), which is expressed in the YUV color space, to frame buffer 42 of frame buffer 4. The writing of background color data (Yh, Uh, Vh) is performed, for example, in the following manner. First, host processor 7 outputs the coordinate values of the starting point and ending point of the first scanning line on the screen of display device 9 to frame buffer 4. Host processor 7 also outputs background color data (Yh, Uh, Vh) as the color data of the starting point and ending point to frame buffer 4. This color data (Yh, Uh, Vh) shows the same color as the color data (Rh, Gh, Bh) stored in background frame buffer 3.

In frame buffer 4, shading element 41 obtains color data for each pixel which is between the starting point and the ending point of the first scanning line, by performing linear interpolation. Shading element 41 writes the color data obtained for each pixel and the color data of the starting point and ending point of the first scanning line in the corresponding part of frame buffer 42. In this case, because both the color data of the starting point and ending point are (Yh, Uh, Vh), all the color data of each pixel, and the starting point and ending point become (Yh, Uh, Vh).

Next, host processor 7 writes the coordinate values of the starting point and ending point of the second scanning line and the background color data (Yh, Uh, Vh) as the color data of the starting point and ending point to frame buffer 4. In frame buffer 4, shading element 41 performs the same process described above, and writes the background color data (Yh, Uh, Vh) in the part of frame buffer 42 that corresponds to the second scanning line. The above-described process is performed until the final scanning line is reached.

In step S43, host processor 7 outputs the coordinate values (XS, YS) and (XE, YE) of the starting point and ending point of the straight line to be drawn on the screen of display device 9, and the color data (Ra, Ga, Ba) of the straight line, which is expressed in the RGB color space, to anti-alias processor 2.

Figure 5A:
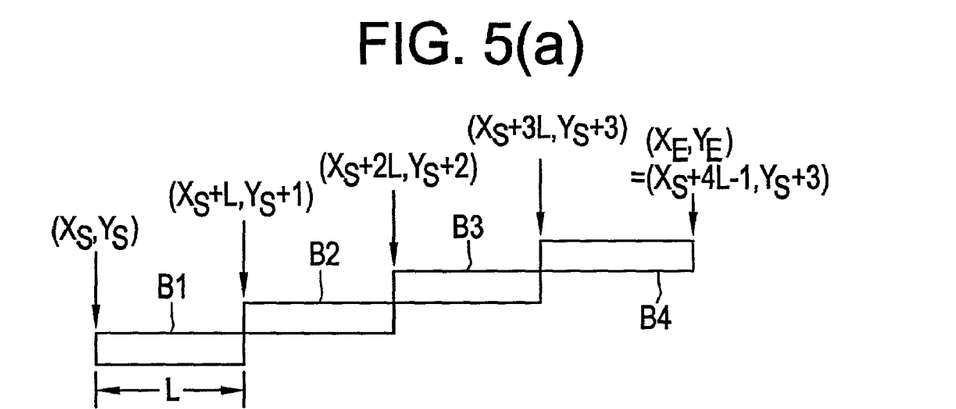
FIG. 5(a) through 5(d) are diagrams for explaining the operation of a shading-instruction element 24 and a partial straight line write element 25.

In anti-alias processor 2, line generator 21 performs linear interpolation between the starting point (XS, YS) and the ending point (XE, YE), and sequentially outputs the coordinate values of respective pixels on respective partial straight lines B1 through B4 shown in FIG. 5(a) starting from the coordinate value of the starting point. In addition, line generator 21 writes the color data (Ra, Ga, Ba), which is sent from host processor 7, to register 23. Register 23 stores the color data (Ra, Ga, Ba) as shown in FIG. 6.

Figure 6:
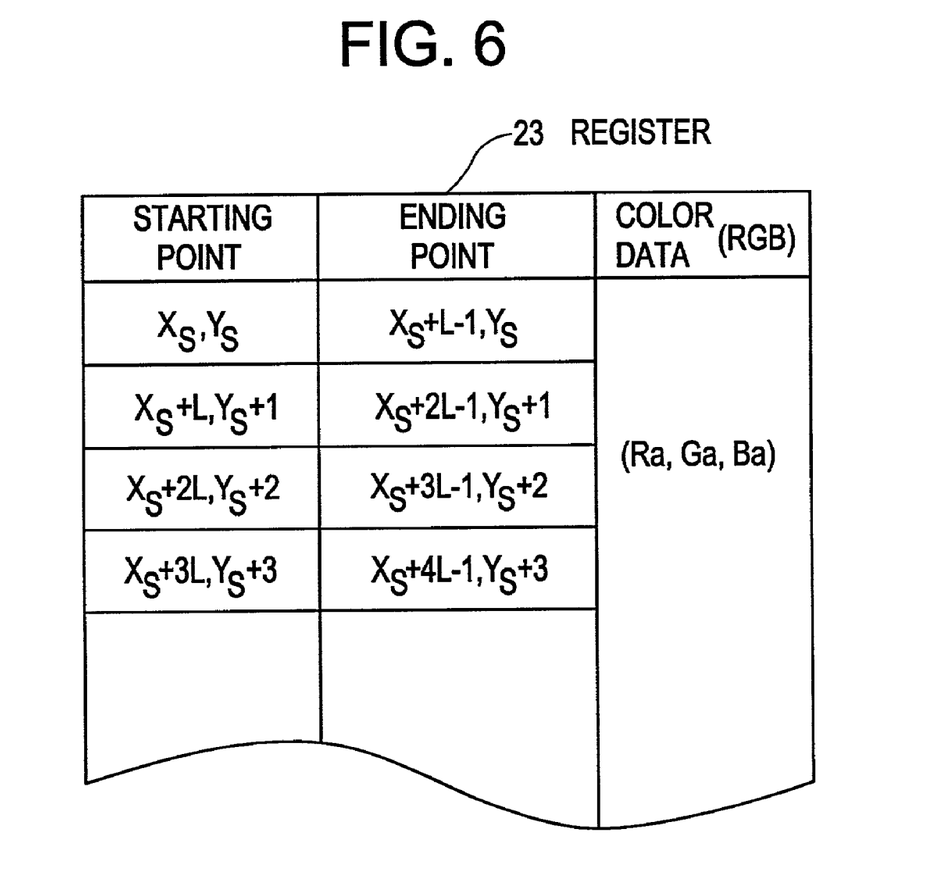
FIG. 6 is a drawing which shows the contents of a register 23.

When the coordinate value (XS, YS) of the starting point is output from line generator 21, address comparator 22 writes it to register 23 as the coordinate value of the starting point of the first partial straight line B1 (see FIG. 6).

When address comparator 22 detects that the coordinate values of the X and Y, which are output from line generator 21, change simultaneously, address comparator 22 writes the coordinate value (XS+L, YS+1) in register 23 as the coordinate value of the starting point of the second partial straight line B2, and writes the coordinate value (XS+L−1, YS), which is the coordinate value of an immediately preceding pixel of the coordinate value (XS+L, YS+1), to register 23 as the coordinate value of the ending point of the first partial straight line. In this manner, whenever address comparator 22 detects that the coordinate values of the X and Y, which are output from line generator 21, change simultaneously, address comparator 22 writes the coordinate values of the starting point and ending point of each partial straight line in register 23. As shown in FIG. 6, register 23 stores the starting point and ending point of each partial straight line.

When the coordinate values of the starting point and ending point of the second partial straight line B2, (XS+L, YS+1) and (XS+2L−1, YS+1), are written in register 23, partial straight line write element 25 outputs the coordinate values to frame buffer 4, and outputs the color data (Ra, Ga, Ba), which is stored in register 23, as each color data of the starting point and ending point of the second partial straight line B2 to RGB-YUV converter 26.

RGB-YUV converter 26 converts the color data (Ra, Ga, Ba) of the starting point and ending point into color data (Ya, Ua, Va) expressed in the YUV color space, and outputs the color data of the starting point and ending point in this order to frame buffer 4.

Figure 5B:
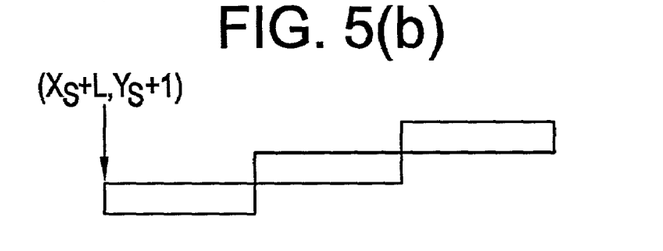

In frame buffer 4, shading element 41 obtains color data for each pixel between the starting point and ending point of the second partial straight line B2 by performing linear interpolation, and writes the color data obtained for each pixel and the color data of the starting point and ending point in frame buffer 42. In this embodiment, all the color data of the pixels on the second partial straight line B2 become (Ya, Ua, Va). In the same way, when the coordinate values of the starting points and ending points of the third and fourth partial straight lines B3 and B4 are written in register 23, partial straight line write element 25 writes the color data in register 23. In this manner, frame buffer 42 stores the color data which are used for displaying as shown in FIG. 5(b), and which are expressed in the YUV color space.

When the process of partial straight line write element 25 is completed, shading-instruction element 24 performs the following process.

Shading-instruction element 24 inputs the coordinate values of the starting point and ending point of the first partial straight line B1, (XS, YS+1) and (XS+L−1, YS+1), and the color data of straight line B1, (Ra, Ga, Ba), from register 23. Shading-instruction element 24 inputs the background color data (Rh, Gh, Bh) from the address which corresponds to the coordinate value of the starting point of the line B1, in background frame buffer 3.

Figure 5C:
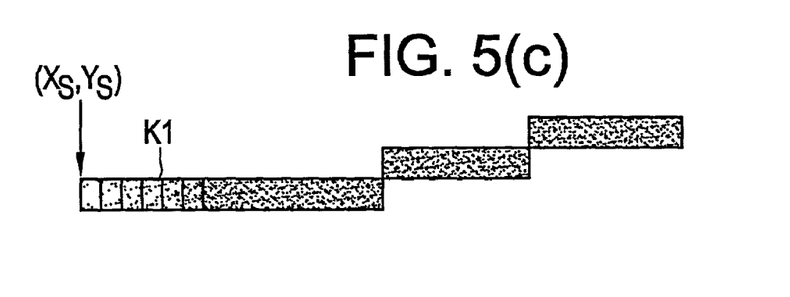

Shading-instruction element 24 produces a shading straight line B1. Shading-instruction element 24 outputs the coordinate values of the starting point and ending point, (XS, YS) and (XS+L−1, YS), of the first partial straight line B1 as the coordinate values of the starting point and ending point of shading range K1, respectively, which is shown in FIG. 5(c), to frame buffer 4. Shading-instruction element 24 outputs the color data (Ra, Ga, Ba) of straight line B1 as the color data of the ending point of shading range K1, and outputs the background color data (Rh, Gh, Bh) as the color data of the starting point of shading range K1 to RGB-YUV converter 26.

RGB-YUV converter 26 converts the color data (Rh, Gh, Bh) and (Ra, Ga, Ba) of the starting point and ending point of shading range K1 into the color data (Yh, Uh, Vh) and (Ya, Ua, Va), which is expressed in the YUV color space, and outputs the color data (Yh, Uh, Vh) and (Ya, Ua, Va) to frame buffer 4.

In frame buffer 4, when shading element 41 receives the coordinate values of the starting point and ending point of shading range K1 and the color data (Yh, Uh, Vh) and (Ya, Ua, Va) of the starting point and ending point, shading element 41 produces color of respective pixels between the starting point and ending point of shading range K1. More specifically, shading element 41 computes the color data for each pixel between the starting point and ending point by performing linear interpolation, and stores the obtained color data for each pixel and the color data of the starting point and ending point into the corresponding area of frame buffer 42. In this manner, frame buffer 42 stores the color data that makes the display of shading range K1 as shown in FIG. 5(c). Thus, frame buffer 42 stores color data of shading range K1, whose starting point has the same color as the background and whose ending point has the same color as straight line B1. Between the starting and ending point of the color data, which is for displaying shading range K1, stored in frame buffer 42, the color of the pixels changes smoothly.

After completion of the above-described process, shading-instruction element 24 inputs the coordinate values of the starting point and ending point of partial straight line B2, (XS+L, YS+1) and (XS+2L−1, YS+1), and the color data of straight line B1, (Ra, Ga, Ba), from register 23. Shading-instruction element 24 inputs the background color data (Rh, Gh, Bh) from the address which corresponds to the coordinate value of the starting point of line B2 of background frame buffer 3.

Figure 5D:
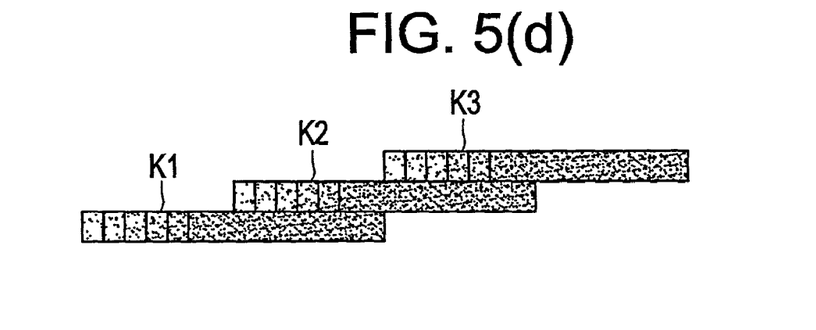

Shading-instruction element 24 produces a shading range K2. Shading-instruction element 24 outputs the coordinate values (XS+L, YS+2) and (XS+2L−1, YS+2), which are obtained by adding 1 to the Y coordinate value of the coordinate values (XS+L, YS+1) and (XS+2L−1, YS+1) of the starting point and ending point of the second partial straight line B2, to frame buffer 4 as the coordinate values of the starting point and ending point of shading range K2 as shown in FIG. 5(d). Shading-instruction element 24 outputs the background color data (Rh, Gh, Bh) as the color data of the starting point of shading range K2, and outputs the color data (Ra, Ga, Ba) of straight line B2 as the color data of the ending point of shading range K2 to RGB-YUV converter 26.

RGB-YUV converter 26 converts the color data (Rh, Gh, Bh) and (Ra, Ga, Ba) of the starting point and ending point of shading range K2 to the color data (Yh, Uh, Vh) and (Ya, Ua, Va), which are expressed in the YUV color space, and outputs the converted data to frame buffer 4.

In frame buffer 4, when shading element 41 receives the coordinate values of the starting point and ending point of shading range K2 and the color data of the starting point and ending point, which is expressed in the YUV color space, shading element 41 produces color for respective pixels between the starting point and ending point of shading range K2. More specifically, shading element 41 computes the color data for each pixel between the starting point and ending point of shading range K2 by performing linear interpolation. Shading element 41 stores the color data obtained for each pixel and the color data of the starting point and ending point into the corresponding area of frame buffer 42. In this manner, frame buffer 42 stores the color data expressed in the YUV color space that makes the display of shading range K2 as shown in FIG. 5(d).

Shading-instruction element 24, RGB-YUV converter 26 and shading element 41 performs the same process to the third partial straight line B3. In frame buffer 4, frame buffer 42 stores the color data expressed in the YUV color space that makes the display of shading range K3 as shown in FIG. 5(d).

In the embodiment, while shading-instruction element 24 does not perform the process for the partial straight line B4, it may be possible to perform the process to partial straight line B4.

The YUV-RGB converter 5 sequentially reads a frame of color data, which is expressed in the YUV color space, from frame buffer 42 of frame buffer 4, and converts the color data into the color data expressed in the RGB color space.

DA converter 6 converts the color data, which is expressed in the RGB color space and is output from the YUV-RGB converter 5, into an analog signal and outputs it to display device 9.

In the embodiment, although shading is performed after converting the color data, which is expressed in the RGB color space, into the color data, which is expressed in the YUV color space, it is possible to use another color space as long as the space is a brightness-separable color space where color can be expressed by being separated into brightness and chromaticity. For example, the YIQ color space or Lab color space can be used. If the YUV color space or YIQ color space is used, circuit structure becomes simpler when compared to the Lab color space because a calculation for conversion of a color space is more simple than a calculation when the Lab color space is used.

While this invention has been described in conjunction with the preferred embodiments described above, it will now be possible for those skilled in the art to put this invention into practice in various other manners.

What is claimed is:

1. An image processing device comprising:
   a first element which produces partial straight lines in a background, each of which has a horizontal axis, wherein each of said horizontal axes are parallel with each other;
   a second element which separates a color brightness data, expressed in a brightness-separable YUV color space where color can be expressed by being separated into brightness and chromaticity, of said background and each of said partial straight lines; and
   a third element which produces a shading range having a starting point and a ending point, wherein said shading range is adjacent to one of said partial straight lines, and makes the brightness of said shading range change smoothly in said brightness-separable YUV color space, from said starting point to said ending point by placing the brightness data of said background at said starting point and the brightness data of said straight line at said ending point.

2. The image processing device as claimed in claim 1, further comprising:
   a frame buffer; and
   a fourth element which writes a predetermined one or plurality of said partial straight lines to said frame buffer; and
   wherein said third element writes said range to said frame buffer.

3. An image processing device comprising:
   a first element which produces partial straight lines in a background, each of which has a horizontal axis, wherein each of said horizontal axes are parallel with each other;
   a second element which separates a color brightness data, expressed in a brightness-separable YUV color space where color can be expressed by being separated into brightness and chromaticity, of said background and each of said partial straight lines; and
   a third element which produces shading ranges having a starting point and a ending point, wherein said shading ranges are adjacent to said partial straight lines, respectively, and make the brightness of each of said shading ranges change smoothly in said brightness-separable YUV color space, from said starting point to said ending point by placing the brightness data of said background at said starting point and the brightness data of said straight line at said ending point.

4. The image processing device as claimed in claim 3, further comprising:
   a frame buffer; and
   a fourth element which writes a predetermined one or plurality of said partial straight lines to said frame buffer; and
   wherein said third element writes said ranges to said frame buffer.

* * * * *